(12) United States Patent
Hanlon

(10) Patent No.: US 12,187,336 B2
(45) Date of Patent: Jan. 7, 2025

(54) DOLLY FRAME

(71) Applicant: Perfect Site LLC, Las Vegas, NV (US)

(72) Inventor: Jared W. Hanlon, Las Vegas, NV (US)

(73) Assignee: Perfect Site LLC, Las Vegas, NV (US)

( * ) Notice: Subject to any disclaimer, the term of this patent is extended or adjusted under 35 U.S.C. 154(b) by 302 days.

(21) Appl. No.: 17/859,237

(22) Filed: Jul. 7, 2022

(65) Prior Publication Data

US 2023/0024997 A1 Jan. 26, 2023

Related U.S. Application Data

(60) Provisional application No. 63/221,480, filed on Jul. 13, 2021.

(51) Int. Cl.
*B62B 3/02* (2006.01)

(52) U.S. Cl.
CPC ............ *B62B 3/02* (2013.01); *B62B 2206/02* (2013.01)

(58) Field of Classification Search
CPC .. B62B 3/02; B62B 3/007; B62B 3/10; B62B 2206/02

See application file for complete search history.

(56) References Cited

U.S. PATENT DOCUMENTS

| | | | | |
|---|---|---|---|---|
| 2,003,162 A | * | 5/1935 | Ulmer | B62B 3/02 280/35 |
| 3,376,046 A | * | 4/1968 | Kivett | B62B 1/10 206/508 |
| 6,109,625 A | * | 8/2000 | Hewitt | F16M 11/18 280/43.24 |
| 6,783,147 B1 | * | 8/2004 | Green, Sr. | B62B 1/20 D34/12 |
| 6,983,946 B2 | * | 1/2006 | Sullivan | B65D 25/2841 220/4.27 |
| 7,066,477 B2 | * | 6/2006 | Dubois | B62B 3/16 280/166 |
| 7,726,669 B2 | * | 6/2010 | Alexander | A47B 37/00 280/47.131 |
| 8,104,775 B2 | * | 1/2012 | Hadar | B65G 1/07 312/312 |
| 9,415,786 B1 | * | 8/2016 | Lorrigan | B62B 1/206 |
| 2020/0130719 A1 | * | 4/2020 | Saeli | B62B 3/02 |

FOREIGN PATENT DOCUMENTS

CN 108382434 A * 8/2018 .............. B62B 3/02

OTHER PUBLICATIONS

Mechanical translation of CN108382434, Oct. 2018.*

(Continued)

*Primary Examiner* — John D Walters
(74) *Attorney, Agent, or Firm* — Weide & Miller, Ltd.

(57) ABSTRACT

A dolly frame includes a rectangular-shaped body having a first component and a second component coupled to the first component. The body movable between a retracted position and an expanded position. The dolly frame also includes a plurality of casters coupled to a first side of the body and configured to allow the body to roll on a surface. When the body moves from the retracted position to the expanded position, the first component slides with respect to the second component, thereby increasing a perimeter of the body.

20 Claims, 11 Drawing Sheets

(56) References Cited

OTHER PUBLICATIONS

Amazon.com; Akro-Mils RU843HR1420 Powder Coated Steel Panel 4-Wheel Dolly; https://www.amazon.com/Akro-Mils-RU843HR1420-Powder-Attached-Containers; 2012; 3 pages.
Amazon.com; SPACECARE Mobile Roller; https://www.amazon.com/SPACECARE-Telescopic-Furniture-Locking-Casters; 2017, 6 pages.
Amazon.com; Steel Dolly with Open Deck & Steel Wheels; https://www.amazon.com/Steel-Dolly-Open-Wheels-Capacity; 2014; 2 pages.
Amazon.com; W B D Weibida Appliance Dolly Cart; https://www.amazon.com/WEIBIDA-Adjustable-Appliance-Furniture-Refrigerator; Dec. 4, 2020; 7 pages.
ShopAbunda; Best Equip Furniture Dolly; https://www.shopabunda.com/products/bestequip-furniture-dolly-1600lbs-capacity-stainless-steel-moving-dollary-24x24-inch-wheeled-platform-heavy-duty-movers-with-4-swivel-wheels-for-furniture-moving-handling-equipment; Jun. 26, 2021; 4 pages.

\* cited by examiner

DOLLY FRAME

RELATED APPLICATION DATA

This application claims benefit to U.S. Provisional Patent Application No. 63/221,480, filed Jul. 13, 2021.

FIELD OF THE INVENTION

The present invention relates to dolly frames.

BACKGROUND OF THE INVENTION

A variety of dolly configurations are known. In general, dollies comprise a support which is supported on a plurality of wheels or casters.

Dollies are useful for many reasons, including facilitating the movement of items which are not relatively movable. In particular, a user may locate an item on the support of the dolly and then push the dolly on its wheels. Dollies as thus frequently used by movers, such as for moving furniture, appliances and the like.

Current dollies would be more useful in other applications, except that the dollies suffer from various disadvantages. First, most, if not all, dollies have a fixed size and shape. This is undesirable because it is often the case that users will desire to transport loads that have different sizes. Second, while some dollies are provided with casters to allow them to roll on surfaces, it is often the case that the number and position of such casters is undesirably restrictive and not conducive to allow the dolly frames to roll efficiently on surfaces. Third, most dolly frames typically have a central through hole, thus not providing a mechanism for the weight of loads being carried to properly be dispersed over. Fourth, most dolly frames are undesirably limited in their ability to stack with one another, thereby making packing and storage more difficult for users. Another problem is that the supporting portions of dollies are usually flat. Thus, an item that is placed on the dolly may often slide off during transport. Finally, many prior art dolly frames are made of wood, thus presenting contamination issues when sensitive loads are transported. For at least the foregoing reasons, there is room for improvement in the art of dolly frames.

SUMMARY OF THE INVENTION

One aspect of the invention is directed to a dolly frame. The dolly frame comprises a rectangular-shaped body comprising a first component and a second component coupled to the first component, the body being movable between a retracted position and an expanded position; and a plurality of casters coupled to a first side of the body and configured to allow the body to roll on a surface. When the body moves from the retracted position to the expanded position, the first component slides with respect to the second component, thereby increasing a perimeter of the body.

A further aspect of the invention is directed to another dolly frame. The dolly frame is adapted to accept a tote lid. The dolly frame comprises a rectangular-shaped body having a central thru hole; and a plurality of casters coupled to a first side of the body and configured to allow the body to roll on a surface, the plurality of casters being sized and positioned to allow for multiple dolly frames to be stacked, such that the plurality of casters nest within an adjacent body of an adjacent dolly frame. The frame is configured to receive the tote lid in a snap-fit manner such that the first side is engaged with the tote lid.

Further objects, features, and advantages of the present invention over the prior art will become apparent from the detailed description of the drawings which follows, when considered with the attached figures.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

As employed herein, the term "coupled" shall mean connected together either directly or through one or more intermediate parts or components.

As employed herein, the term "number" shall mean one or an integer greater than one (i.e., a plurality).

The description of elements in each figure may refer to elements of proceeding figures. Like numbers refer to like elements in all figures, including alternate embodiments of like elements.

Figure 1:
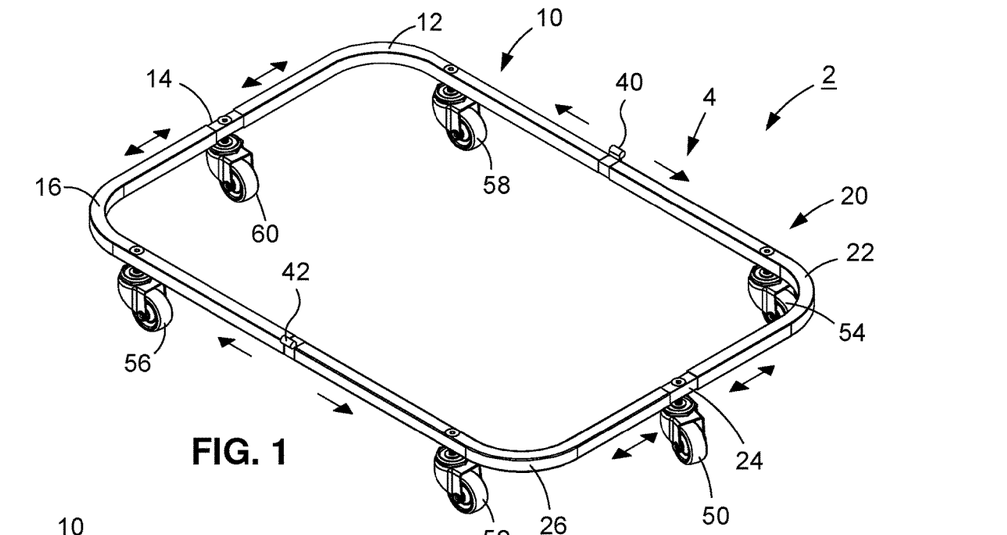
FIG. 1 is an isometric view of a dolly frame, shown with a body in a retracted position, in accordance with one non-limiting embodiment of the disclosed concept.
Figure 2:
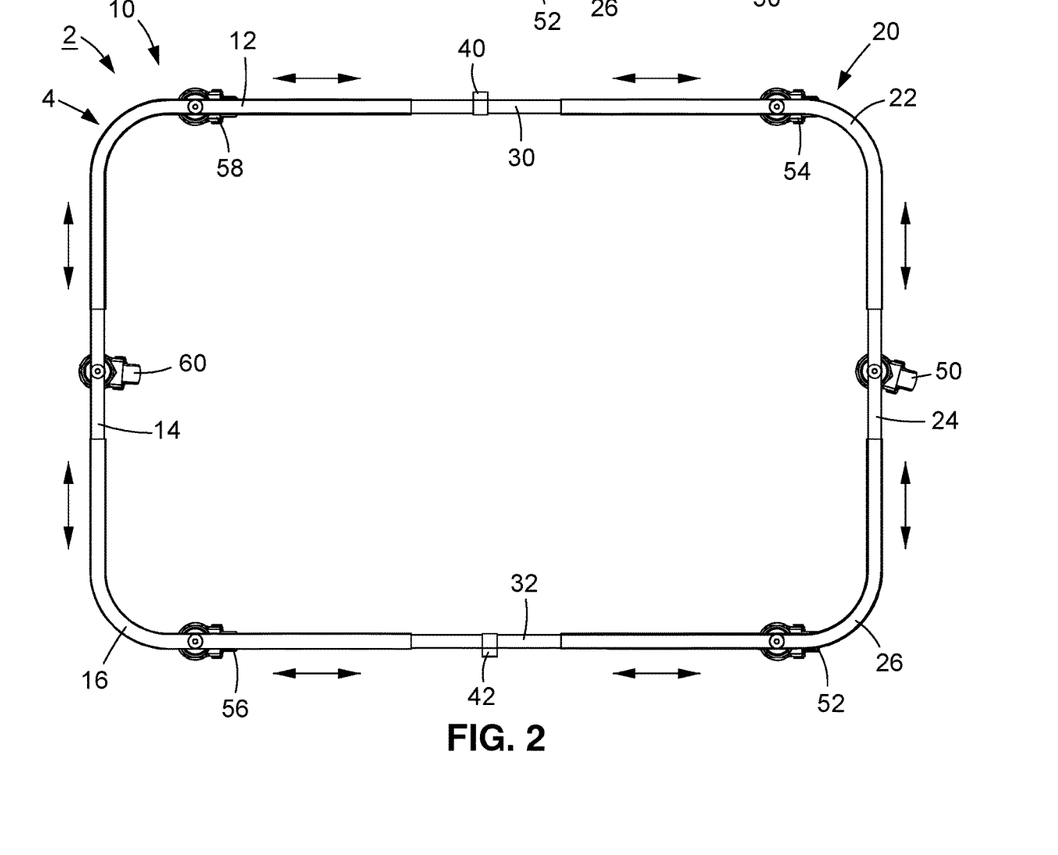
FIG. 2 is a top plan view of the dolly frame of FIG. 1, shown with the body in an expanded position.
Figure 3:
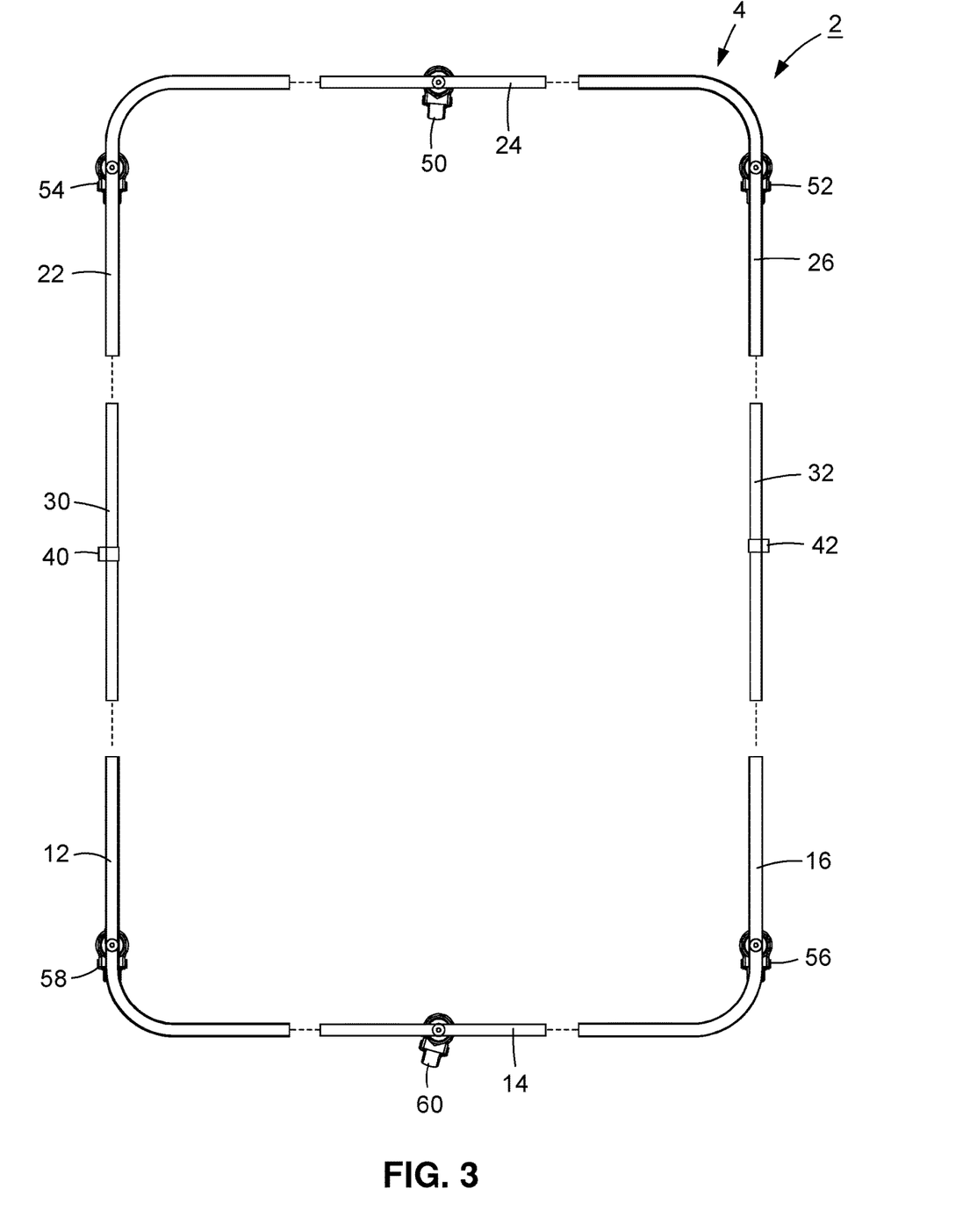
FIG. 3 is an exploded top plan view of the dolly frame of FIG. 2.

FIGS. 1-3 are different views of a dolly frame 2. Dolly frame 2 may comprise a body or support 4 which is formed of a rigid material, and preferably metal. In a preferred embodiment, the body 4 is formed from tubing, such as square-cross section tubing, although tubing of other shapes (such as round) might be utilized. Examples of a rigid metal material include, but are not limited to, steel square tubing, aluminum tubing, metal alloys, etc.

As will be discussed, dolly frame 2 is advantageously configured to support loads/items (e.g., as described below, such may comprise various objects, such totes and tote lids) of different sizes, and to allow those loads to be transported with respect to a surface. Preferably, the dolly frame 2 is rollably supported. For example, as shown most clearly in FIG. 1, dolly frame 2 further includes a plurality of casters 50,52,54,56,58,60 that are coupled to a first or bottom side of the body 4 and configured to allow body 4 to roll on a surface. The casters 50,52,54,5658,60 may be pivotally connected to the body 4 or may be connected to the body 4 and include a wheel pivot, thus permitting the wheel of each caster to pivot or rotate, thus allowing the dolly frame 2 to be moved in different directions with the wheels aligned in the direction of movement.

The dolly frame 2 may support objects of various sizes. In one preferred configuration, the dolly frame 2 is configured to facilitate the transport of one or more totes and/or associated tote lids. Totes are widely known and generally comprise a storage container having a bottom and an upwardly extending sidewall with an open top that may be selectively closed with a lid, such as may snap onto a top rim of the container portion of the tote. The tote may be constructed of a relatively rigid material, such as plastic and may include features such as handles or the like. These totes are commonly available in a range of sizes (generally being square or rectangular in cross-sectional shape and having side walls of various heights) and thus capacities. For example, totes are available in five, seventeen, and twenty seven gallon capacities.

In one configuration, the body 4 is preferably dimensioned to correspond with a desired tote lid. As such, size and shape of the body 4 is preferably designed to correspond with a mating tote lid. In particular, in one embodiment, the body 4 may be shaped and sized to fit within a peripheral groove that is normally used to mount a tote lid to a mating container, whereby the tote lid may be placed into engagement with the body 4.

The body 4 may be configured to be a fixed size, such as to accept or fit a particular sized tote lid. However, as described herein, tote lids often come in different sizes. Such, in accordance with the disclosed concept, and in order to allow for different sized loads to be transported, dolly frame 2 includes a body 4 which may adjusted so that it has different sizes or shapes.

For example, in one embodiment, the body 4 is generally quadrilateral in shape, such as being rectangular in shape (e.g. having sides which are at generally right angles to one another and having a length which exceeds a width). However, the body 4 might be square or have other shapes. Further, as illustrated, the body 4 generally comprises or defines a frame, which frame is generally closed and defines at least one main or central opening therethrough.

Most preferably, the body 4 is movable between a retracted position (FIG. 1) and an expanded position (FIG. 2). As shown clearly in FIG. 2, the body 4 may include at least two portions which are thus movable relative to one another. For example, the body 4 may comprise a first U-shaped frame portion 10, a second U-shaped frame portion 20 coupled to first U-shaped portion 10, and first and second extensions 30,32 extending therebetween. The first and second U-shaped frame portions 10,20 may be single elements, such as formed by bending a section of tubing.

The extensions 30,40 may extend between and couple the U-shaped frame portions 10,20 in an adjustable manner. For example, the U-shaped frame portions 10,20 and corresponding extensions 30,32 preferably have the same cross-sectional shape, but where the extensions 14,24 may be slightly smaller in dimension than the corresponding frame portion 10,20, thus permitting the extensions 14,24 to fit within the hollow interior thereof. This allows the U-shaped frame portions 10,20 and extensions 30,32 to slide relative to one another.

So described, the size of the body 4 may be adjusted in one direction, such as a length-wise direction. In another configuration, the first U-shaped frame portion 10 may be comprised of first, second, and third segments 12,14,16 (such as two bent end segments and a straight middle segment), and the second U-shaped frame portion 20 may be comprise of corresponding first, second and third segments

22,24,26. The second segments 14,24 may serve as extensions between/coupling the first segments 12,22 to the third segments 16,26.

In operation, first, second, and third segments 12,22,14, 24,16,26 are slidably coupled to each other (e.g., they are configured to slide with respect to each other) in order to change a dimension of the perimeter of the body 4. Compare, for example, the length of body 4 in FIG. 1 versus FIG. 2. As such, when body 4 moves from the retracted position (FIG. 1) to the expanded position (FIG. 2), first segments 12,22 and third segments 16,26 slide with respect to second segments 14,24, thereby changing a dimension of the body 4 in a first direction, such as a width-wise direction. Similarly, first and third segments 12,22,16,26 of U-shaped apparatus 10,20, are slidably coupled to first and second components 30,32 (FIG. 2) (e.g., are configured to slide with respect to each other) in order to change a dimension of the body 4 in a second direction, such as a length-wise direction of the body 4. Compare, for example, the length of body 4 in FIG. 1 versus FIG. 2.

Accordingly, it will be appreciated that by having body 4 be movable between expanded and retracted positions, different sized loads (including tote lids) can advantageously be supported and transported on dolly frame 2 or be connected to the body 4. Specifically, if a smaller dimensioned load needs to be transported, the body 4 can be moved to the retracted position (FIG. 1), and if a larger dimensioned load needs to be transported, the body 4 can be moved to the expanded position (FIG. 2).

In some embodiments, the body 4 is movable into different fixed positions, such as defined by mating stops, latches, pins or the like. For example, spring loaded balls may be mounted to the extensions 30,32 for engagement with spaced mating holes in the U-shaped frame portions 10,20, thus allowing the body 4 to be adjusted to specific positions. However, in other embodiments, the body 4 can be moved and maintained in different positions between the expanded and retracted positions. In some embodiments, one or more stops may still be provided, such as to prevent over-extension of the body 4 (such as by preventing the extensions 30,32 from sliding completely out of the mating U-shaped frame portions 10,20).

Aside from the adjustability feature described above, the "multi-segment" configuration of the body 4 has other advantages. For example, molded plastic and wood dollies exist in fixed sizes. Shipping and storage (such as on a store shelf) thereof is difficult and expensive because of the size of the dolly. The above-described multi-segment dolly frame 2 overcomes many of these problems because the body 4 can be broken down into a number of segments having small dimensions. This reduces the total package size for a packaged dolly for shipment and storage.

In one configuration, as illustrated in FIG. 1, casters are associated with the U-shaped frame portions 10,20, such as by being connected to the three segments 12,14,16 and 22,24,26 of each of the frame portions 10,20.

Figure 19:
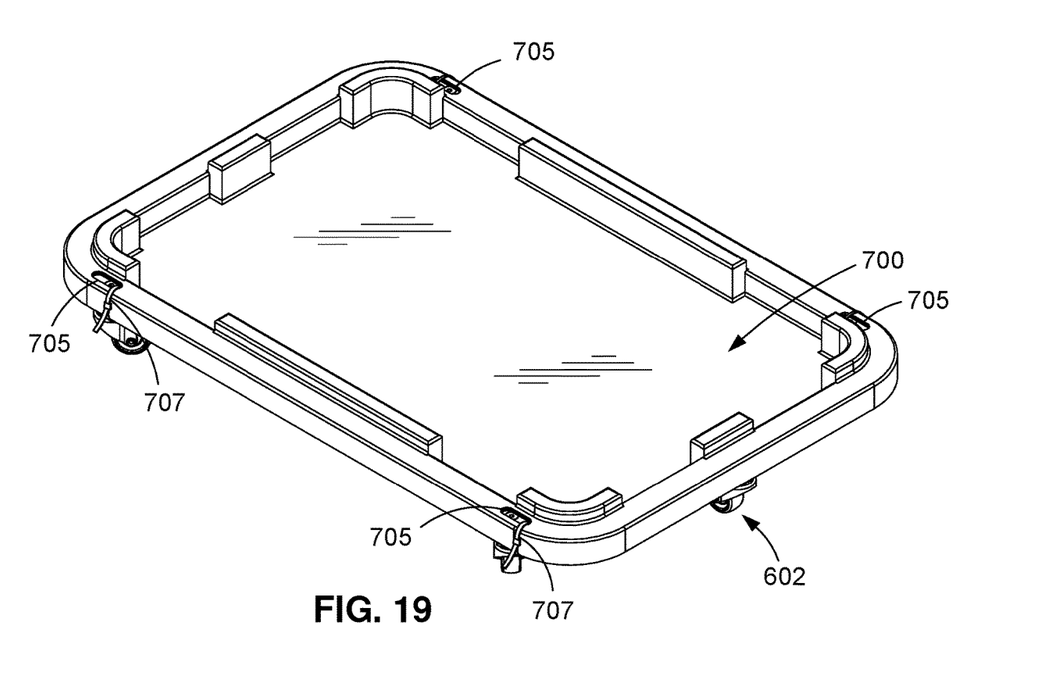
FIG. 19 is an isometric view of a dolly frame coupled to a tote lid, in accordance with another non-limiting embodiment of the disclosed concept.

Continuing to refer to FIGS. 1 and 3, the body 4 may further comprise a first locking tab 40 and a second locking tab 42 each coupled to a middle region of a corresponding one of first and second components 30,32 in order to allow body 4 to engage a tote lid (not shown in FIGS. 1-3, but see tote lid 700 in FIG. 19, for example). This is advantageous, as compared to prior art dolly frames, in that tote lids can better be secured to dolly frame 2 during use. It will be appreciated that the locking tabs 40,42 each have a body structured to be coupled to one of the first and second components 30,32, and a tab or head extending outwardly therefrom. The body may comprise a clip for connection to the body 4, or a define a passage which allows the locking tab 40,42 to be slid onto the body 4. At least the head portion of each locking tab 40,42 is resilient, such as to be compressible. In particular, the head portion preferably protrudes upwardly and can be compressed through an aligned opening of a tote lid (such as openings 705 of tote lid 700, depicted in FIG. 19), whereupon the head expands, thus inhibiting disconnection of the tote lid. Of course, other types of locking or securing mechanisms might be provided, as described in more detail below. Further, the number and location of the locking tabs or other locking mechanisms might vary.

Figure 4:
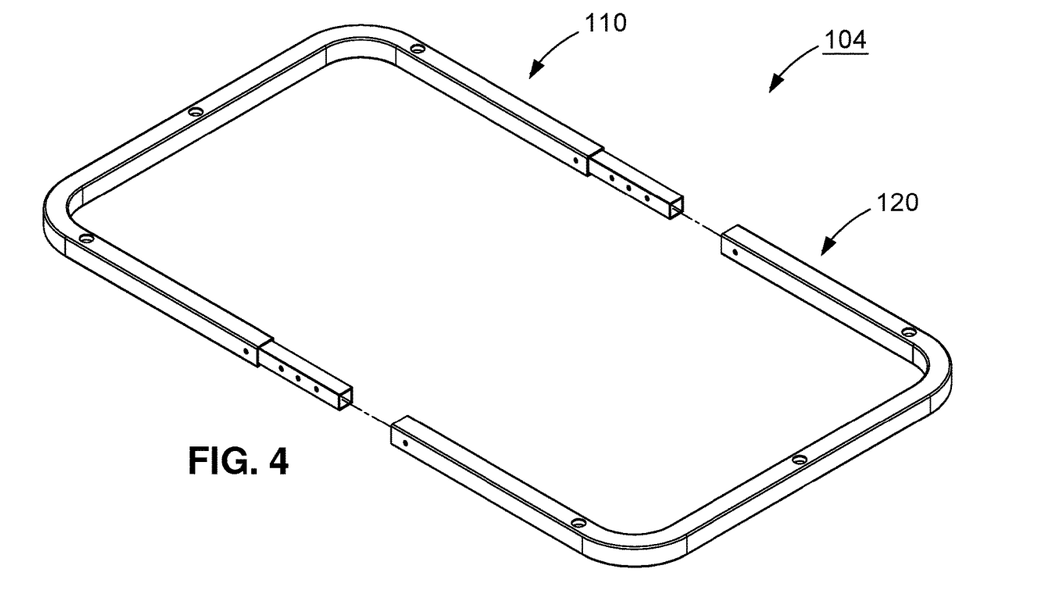
FIG. 4 is an exploded isometric view of a body for another dolly frame, in accordance with another non-limiting embodiment of the disclosed concept.

FIG. 4 shows an exploded view of a body 104 for another dolly frame (not shown). As shown, first U-shaped frame portion 110 is a first component that is configured to extend into and be coupled to the second U-shaped frame portion 120, which is a second component. Accordingly, in the embodiment of FIG. 4, a length of body 104 is variable and configured to move between retracted and expanded positions in order to allow variable sized loads to be supported/transported. It will be appreciated that by having only one dimension (e.g., a length) of body 104 be variable between expanded/retracted positions, constructing body 104 may be easier than constructing body 2 (FIGS. 1-3). Further, in this configuration, a portion of the first U-shaped frame portion 110 is configured to directly engage (such as fit within) the second U-shaped frame portion 120, thus eliminating separate connecting extension segments (30,32 as in the embodiment illustrated in FIG. 1).

Figure 5:
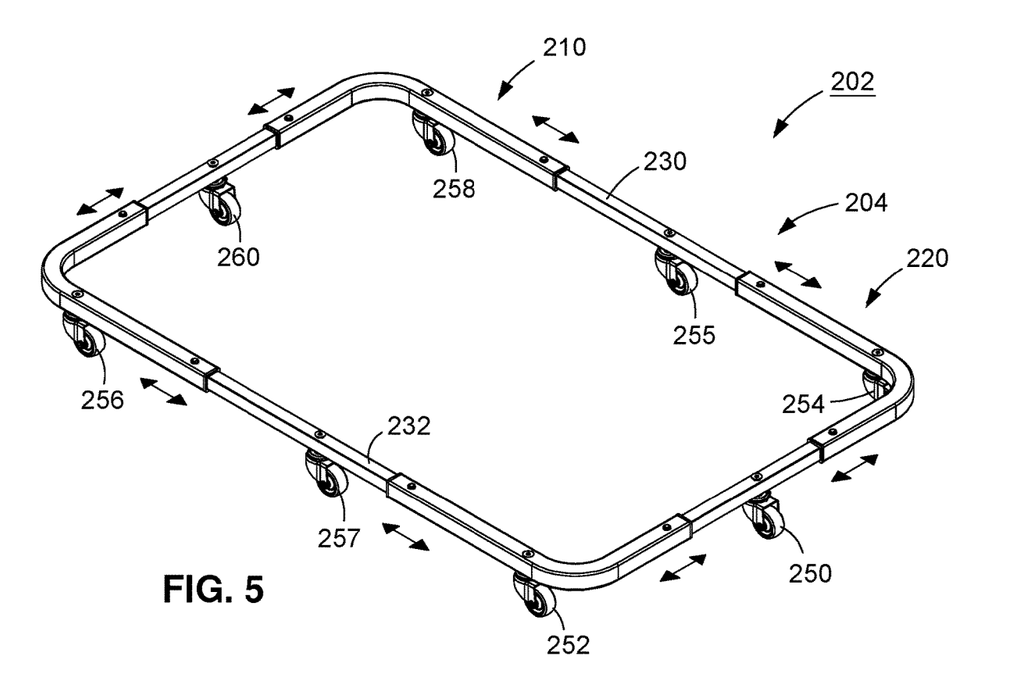
FIG. 5 is an isometric view of another dolly frame, shown with a body in an expanded position, in accordance with another non-limiting embodiment of the disclosed concept.

FIG. 5 shows an isometric view of another embodiment of a dolly frame 202. As shown, the body 204 again comprises first and second U-shaped frame portions 210,220 that are slidably coupled to first and second extensions 230,232 (similar to the body 2, discussed above relative to FIG. 1). However, in this embodiment, casters are not only connected to the segments of the U-shaped frame portions 210,220, but to the first and second extensions 230,232. Accordingly, dolly frame is provided with eight total casters 250,252,254, 255,256,257,258,260. As a result, loads, such as totes/tote lids, are advantageously able to be rolled on surfaces with greater stability and with more support, as compared to prior art dolly frames, which may only have casters provided at corners of such frames. Among other things, an advantage of having casters associated with the extensions 230,232 is that when the body 204 is moved to its extended position, casters 255,257 are located along the now extended or expanded sizes to provide better load support (without those casters, the distance between the remaining casters on each side may be sufficiently great to allow flexing of the body along the sides).

Figure 6:
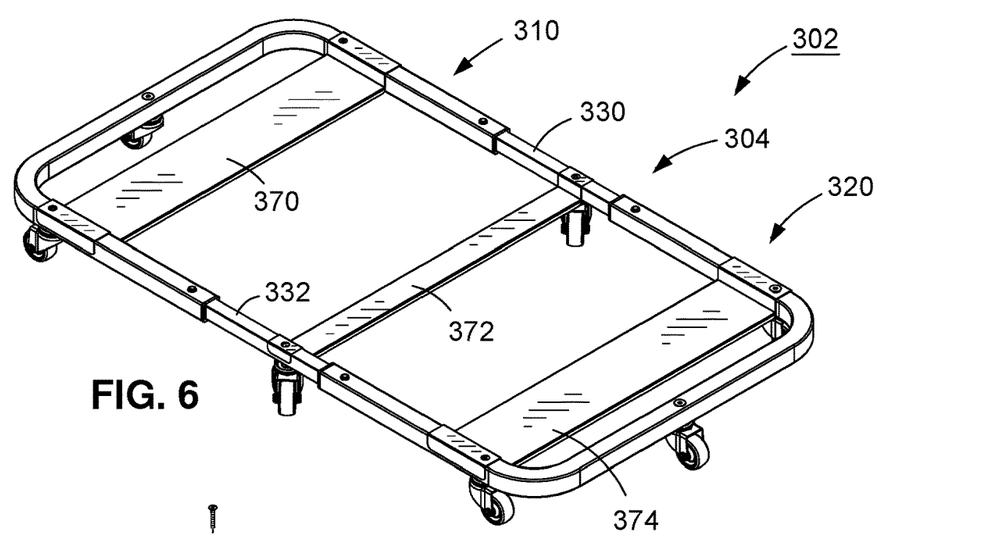
FIGS. 6 and 7 are isometric and exploded isometric views, respectively, of another dolly frame, in accordance with another non-limiting embodiment of the disclosed concept.
Figure 7:
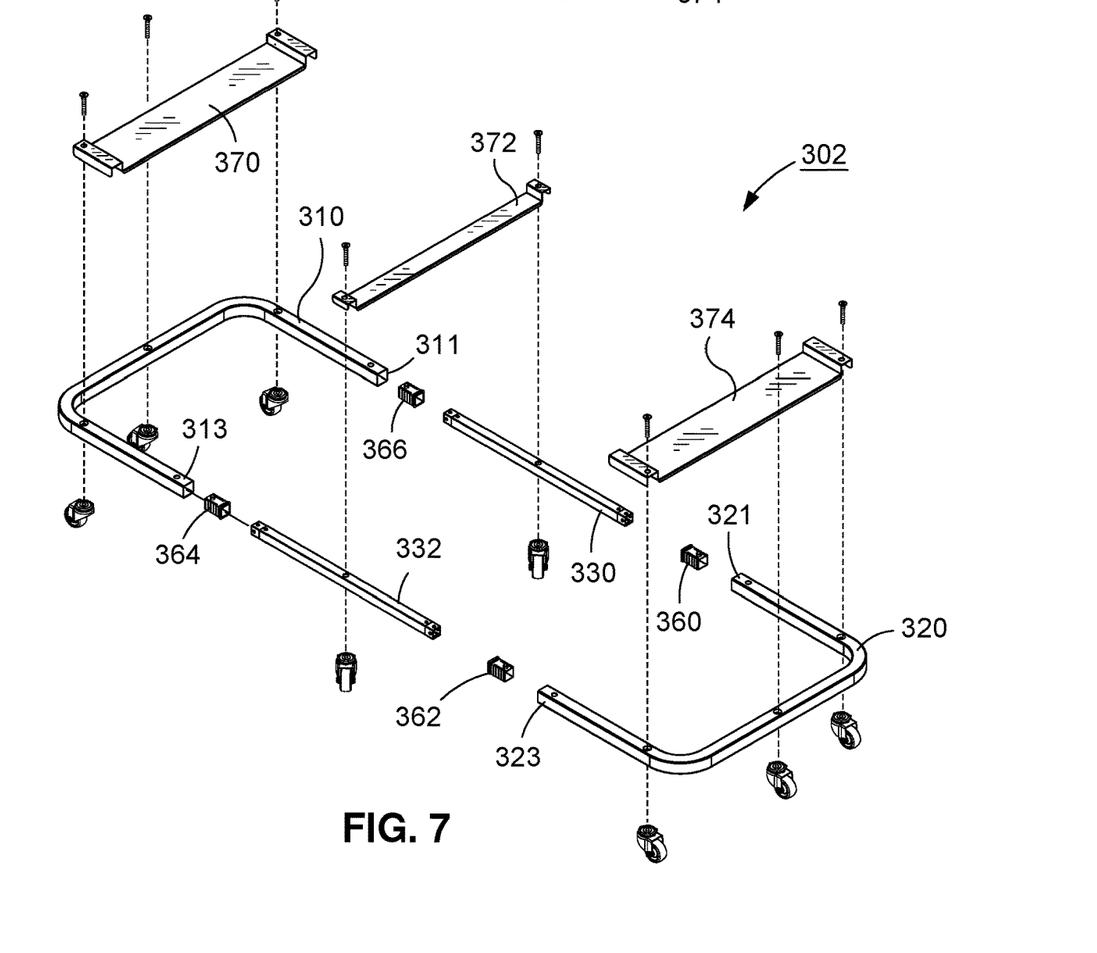

FIGS. 6 and 7 show different views of another dolly frame 302. As shown, this embodiment dolly frame 302 again has multiple segments or portions defining the body 304. For example, the body 304 may comprise U-shaped frame portions 310,320, first and second extensions 330,332, as well as bushings 360,362,364,366 (see FIGS. 8 and 9 for enlarged views of bushings 360,366, respectively) and cross-supports or straps 370,372,374. The first and second U-shaped fame portions 310,320 each have corresponding first and second ends 311,313,321,323. Furthermore, the bushings 360,362,364,366 are each coupled to a corresponding one of the ends 311,313,321,323 in order to allow first and second U-shaped frame portions 310,320 to grip or engage the first and extensions 330,332.

Figures 8, 9:
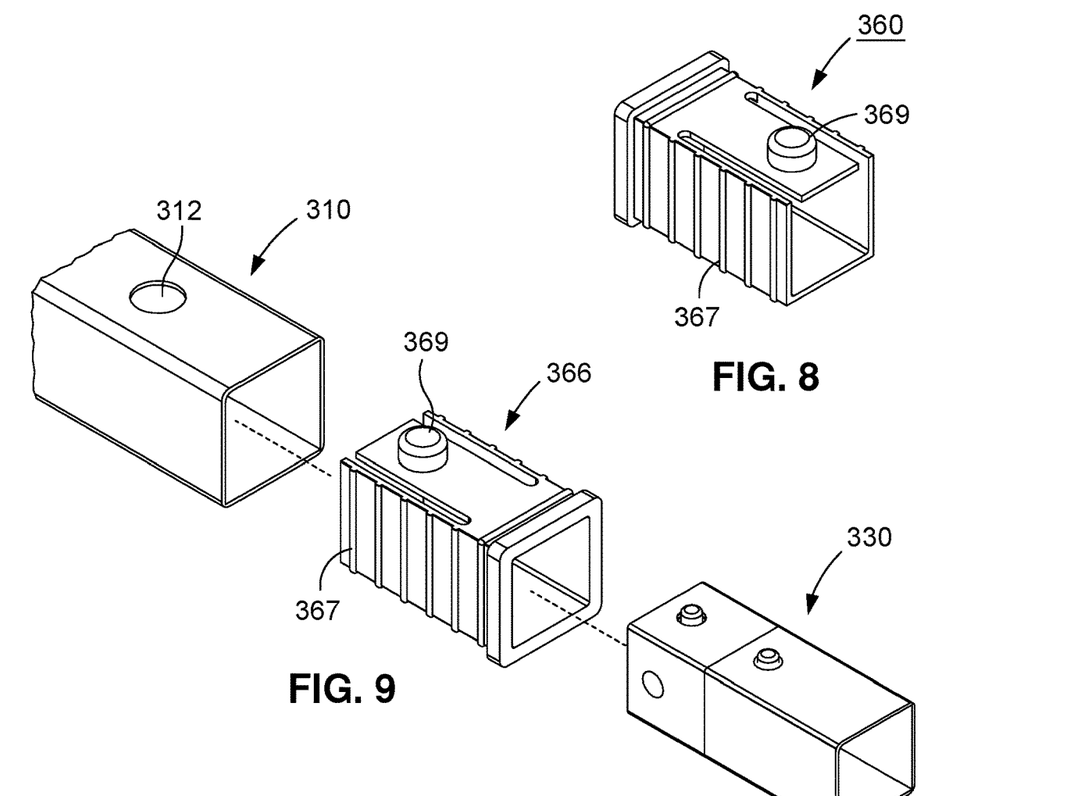
FIG. 8 is an enlarged isometric view of a bushing for the dolly frame of FIG. 7.
FIG. 9 is an enlarged isometric view of a portion of the dolly frame of FIG. 7.

For example, as illustrated in FIGS. 8-9, the bushings 360,362,364,366 may comprise bodies which are square tubes having a first end and a second end. A first end may be configured to be inserted into an end of the U-shaped frame portion 310,320 and the second end may accept therein one of the extensions 330,332. The exterior of the bushing 366 may include ribs 367 or other elements, such as for engaging the inside of the U-shaped frame portion 310,320 to which it is mounted. The bushings may be made of plastic, rubber or a similar durable material and serve to align and guide the movement of the extensions 330,332 in and out of the corresponding U-shaped frame portions 310,320. As illustrated, the "insertion" end of the bushing may be slotted, such as to permit one or more of the side walls thereof to be compressed inwardly to facilitate insertion thereof into the U-shaped frame member 310,320.

In one embodiment, a locking mechanism may be provided for securing the bushing 360,362,364,366 to the end of its corresponding U-shaped mount 310,320. This may comprise, for example, a pin 369 or other element which extends outwardly from the bushing for engagement with a mating aperture 312 in the U-shaped frame portion 310,320. As illustrated, the pin 369 may be connected to one of the sides of the bushing, such as which is slotted relative to the others to permit that side to be flexed or bent inwardly to facilitate connection and disconnection thereof from the aperture 312. The locking mechanism may generally prevent inadvertent disconnection of the bushing, but facilitate connection thereof during assembly of the dolly frame 302 and/or for replacement/repair purposes.

It will also be appreciated with reference to FIGS. 6 and 7 that the cross-supports or straps 370,372,374, which may be made of a rigid metal material but might be made of other materials, may be coupled at their ends to each of the U-shaped apparatus 310,320 so that they extend generally laterally across the body 304 from one side to another. The number of cross-supports or straps 370,372,374 may vary and comprise other than three supports or straps, such as one, two or four or more. Further, they may extend in the length-wise or width-wise direction. As illustrated, a central portion of each cross-support or strap 370,372,374 may be recessed. As illustrated, this causes the supporting portion of the cross-support or strap 370,372,374 to be positioned below a top edge of the body 304, such as at near the bottom of the body 304. This may allow a tote lid that has a recessed central section to still be coupled to the body 304, with the central part of the tote lid positioned in the center of the body 304. Further, loads such as totes or other elements which are placed on the cross-supports or straps 370,372,374 are inhibited from sliding off of the dolly frame 302 because those objects encounter the peripheral frame of the body 304.

Further, instead of the body 304 defining a peripheral frame with a large central opening that results in loads being supported solely at the periphery, the body 304 includes cross-supports to aid in distributed support of those loads (e.g., totes/tote lids). This is safer and more efficient for users using dolly frame 302.

Figure 10:
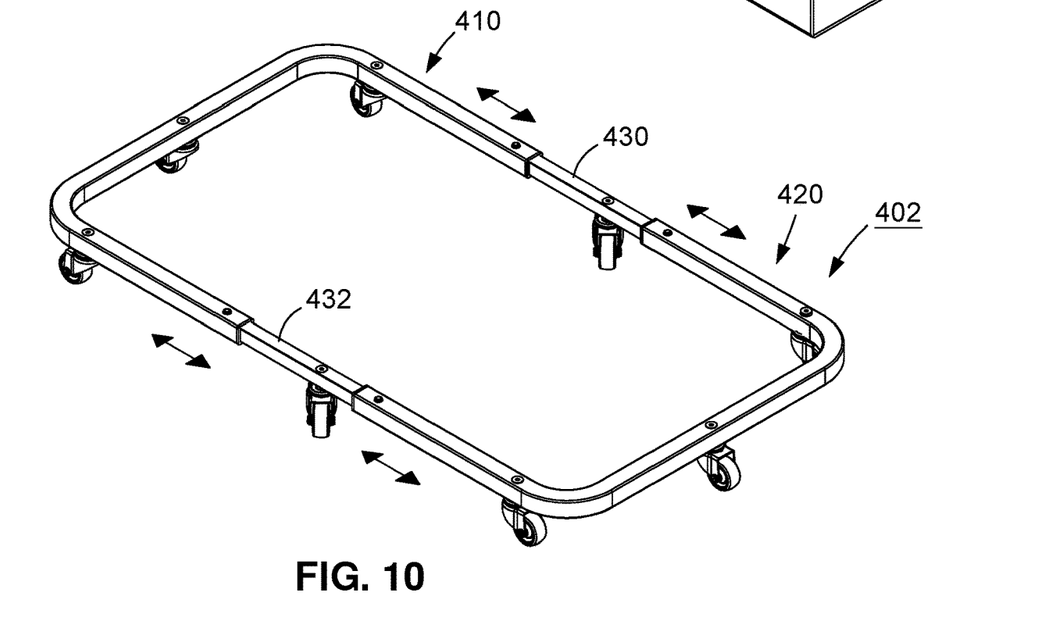
FIGS. 10-12 are isometric, top plan, and section views, respectively, of another dolly frame, in accordance with another non-limiting embodiment of the disclosed concept.
Figure 11:
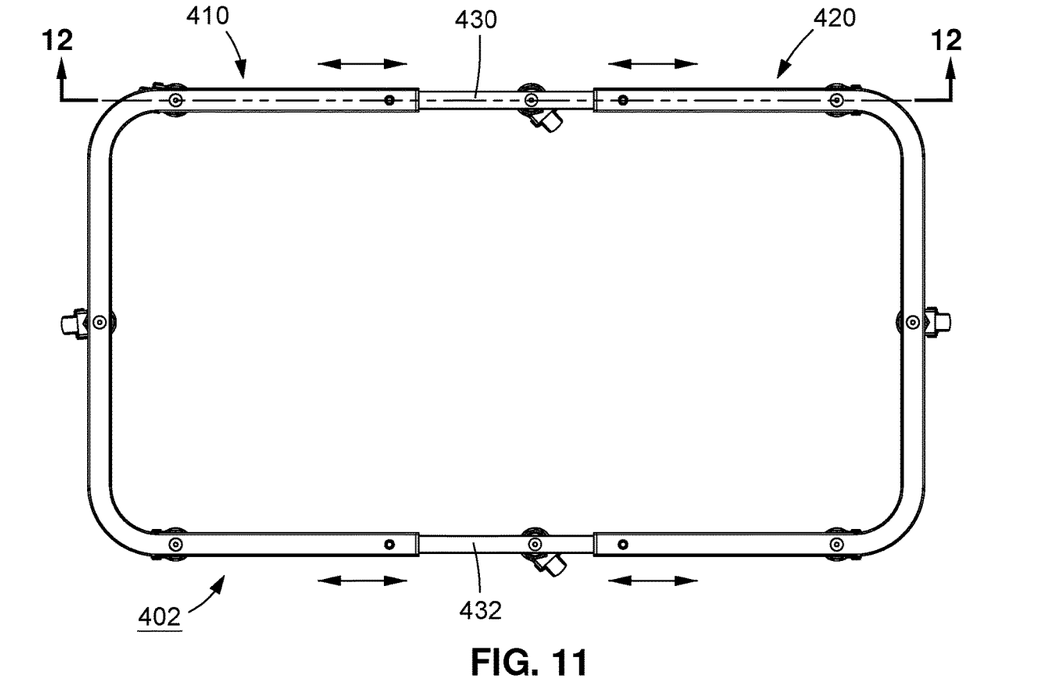
Figure 12:
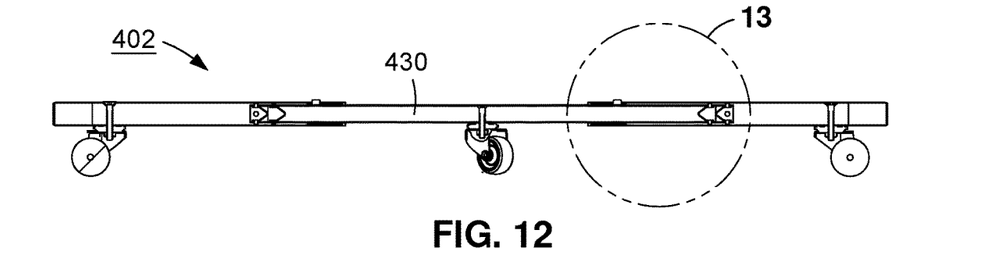
Figure 13:
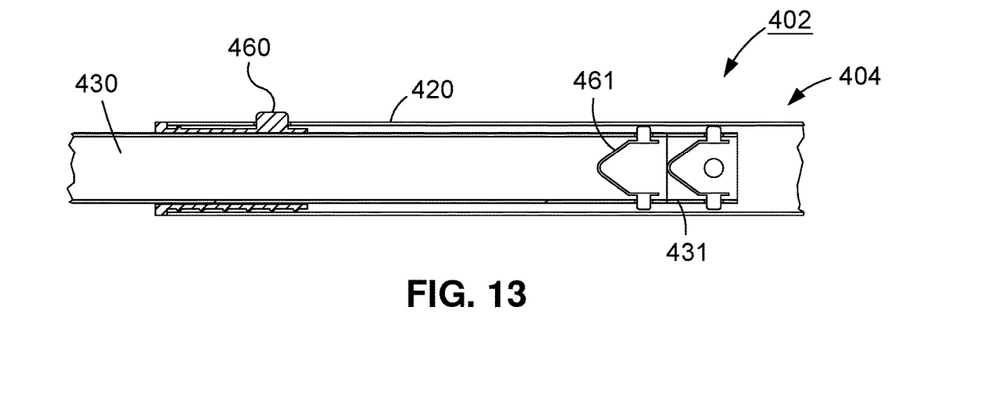
FIG. 13 is an enlarged view of a portion of the dolly frame of FIG. 12.

FIGS. 10-13 show different views of another dolly frame 402. As shown in FIG. 10, the dolly frame 402 again comprises a body 404 having U-shaped frame portions 410,420 which are structured as single unitary components made from single pieces of material, and which are slidably coupled together via first and second extensions 430,432. Additionally, as shown most clearly in FIG. 13, the body 404 further includes a biasing element (e.g., without limitation, a spring clip 461) coupled to an end 431 of the first extension 430. The spring clip 461 is configured to engage an inner edge of a bushing 460 when the first extension 430 is pulled apart from the second U-shaped frame portion 420. It will be appreciated that both ends of first and second extensions 430,432 may be configured to have corresponding spring clips coupled thereto for similar purposes with respect to the four ends of U-shaped frame portions 410,420. In some embodiments, the spring clips 461 may have tabs which are biased outwardly for engagement with mating apertures in the U-shaped frame portions 410,420, thus selectively connecting the spring clips thereto, but permitting them to be disengaged by inward pressure on the tabs.

Figures 14, 15:
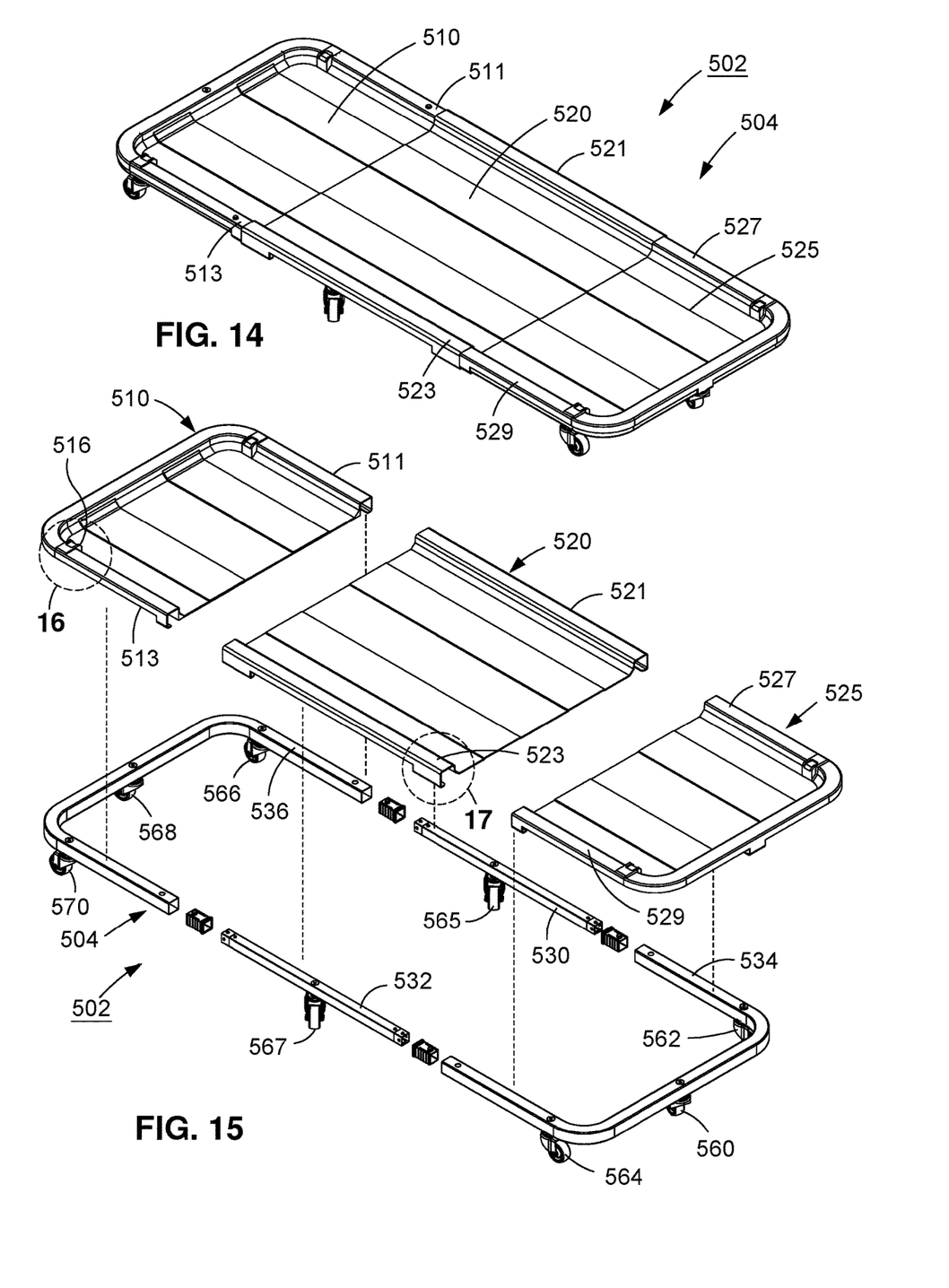
FIGS. 14 and 15 are isometric and exploded isometric views, respectively, of another dolly frame, in accordance with another non-limiting embodiment of the disclosed concept.

In accordance with yet another embodiment of the disclosed concept, FIGS. 14 and 15 show different views of another dolly frame 502. The dolly frame 502 again comprises a body 504, such as in the form of peripheral frame. In addition, as shown, dolly frame 502 includes a deck which generally encloses the otherwise central opening of the body 503. In one configuration, the deck comprises a first end panel 510, a central body panel 520, and a second end panel 525 disposed opposite the first end panel 510. It will be appreciated that when body 504 moves from the retracted position (FIG. 14) to the expanded position (not shown), the first and second end panels 510,525 are designed to slide in and out with respect to the central body panel 520 (such as by overlapping it) so that the central portion of the body 504 is closed regardless of whether the dolly frame 502 is in its expanded or retracted configuration.

Additionally, as shown clearly in FIG. 15, the body 502 may have first and second U-shaped frame portions 534,536 as well as first and second extensions 530,532. Casters 560,562,564,565,566,567,568,570 may be coupled to the U-shaped frame portions 534,536 and the first and second extensions 530,532, as shown in FIG. 15. In this embodiment, the U-shaped frame portions 534,536 and the extensions 530,532 also function together in the same manner as corresponding elements 410,420,430,432 of the dolly frame 402 described above relative to FIG. 10. Furthermore, the U-shaped frame portions 534,536 and extensions 530,532 function to support the end panels 510,525 and the central body panel 520.

Figure 17:
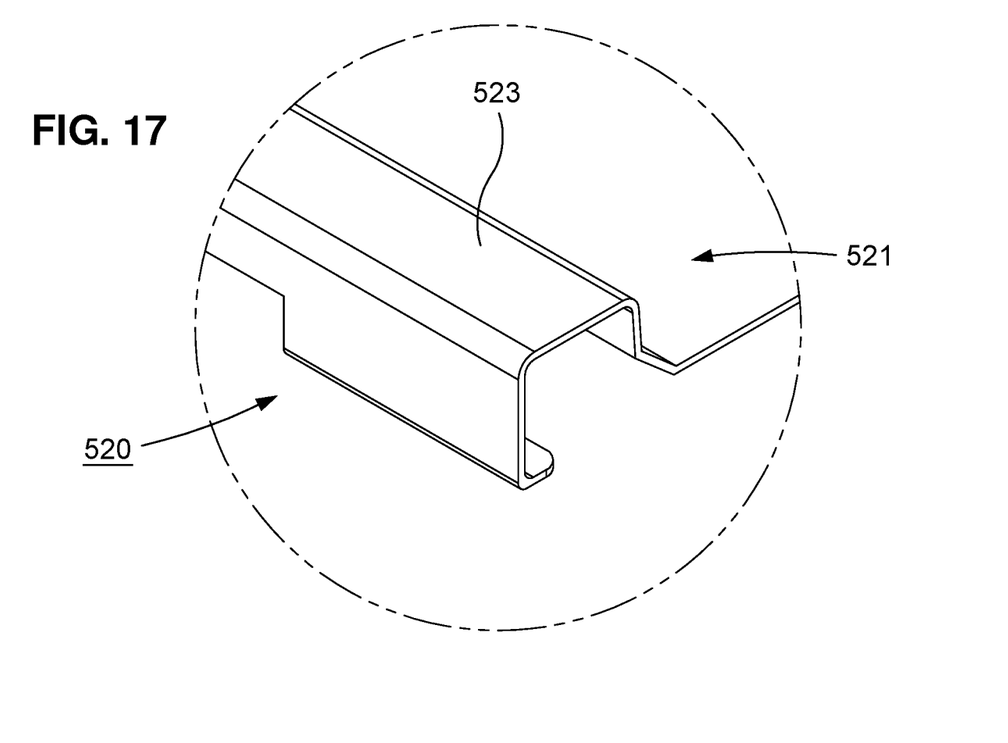

In one embodiment, the deck is mounted to the body 504. More specifically, the first end panel 510, the second end panel 525, and the central body panel 520 may each have corresponding first sleeve portions 511,521,527 and second sleeve portions 513,523,529 each structured to receive a corresponding one of the first and second extensions 530, 532. See, for example, the second sleeve portion 523, shown more clearly in FIG. 17. Additionally, the first and second sleeve portions 521,523 of the central body panel 520 receive the corresponding first and second sleeve portions 511,527,513,529 of the first and second end panels 510,525 when the body 504 is in both the retracted (FIG. 14) and expanded (not shown) positions.

Figure 16:
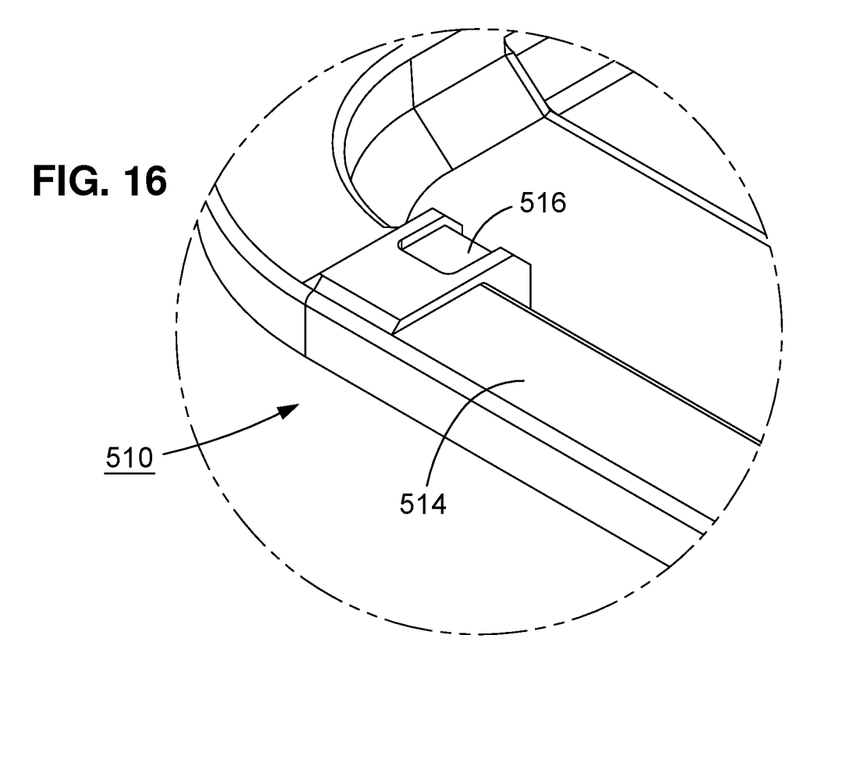
FIGS. 16 and 17 are enlarged views of portions of the dolly frame of FIG. 15.

Referring to FIG. 16, which is an enlarged view of a portion of FIG. 15, the first end panel 510 has a peripheral portion 514 and a stop member 516 extending inwardly from the peripheral portion 514 (e.g., toward an opposing side of the first end panel 510). As shown in FIG. 16, the first end panel 510 has two stop members (only one stop member 516 is labeled) and the second end panel 525 has two stop members (shown but not labeled), all of which are structured the same as the stop member 516 (e.g., and extend inward from peripheral portions of the end panels 510,525). It will be appreciated that the stop members 516 of the first and second end panels 510,525 are configured to maintain an item which is being transported on the dolly frame 502, such as a tote (not shown in FIGS. 14-17, but see tote 1100 in FIG. 23), in a predetermined in a predetermined position with respect to the body 504 of dolly frame 502.

In this regard, once again, the center portion of the deck, such as the center portion of the first and second end panels 510,520 and the central body panel 520, are preferably recessed from the edge or peripheral portions thereof so as to be insert. Thus, when a load is placed thereon, the frame defined by the body 504 serves as a stop around that load to reduce the probably that the load will slide off of the dolly frame 502.

Figure 18:
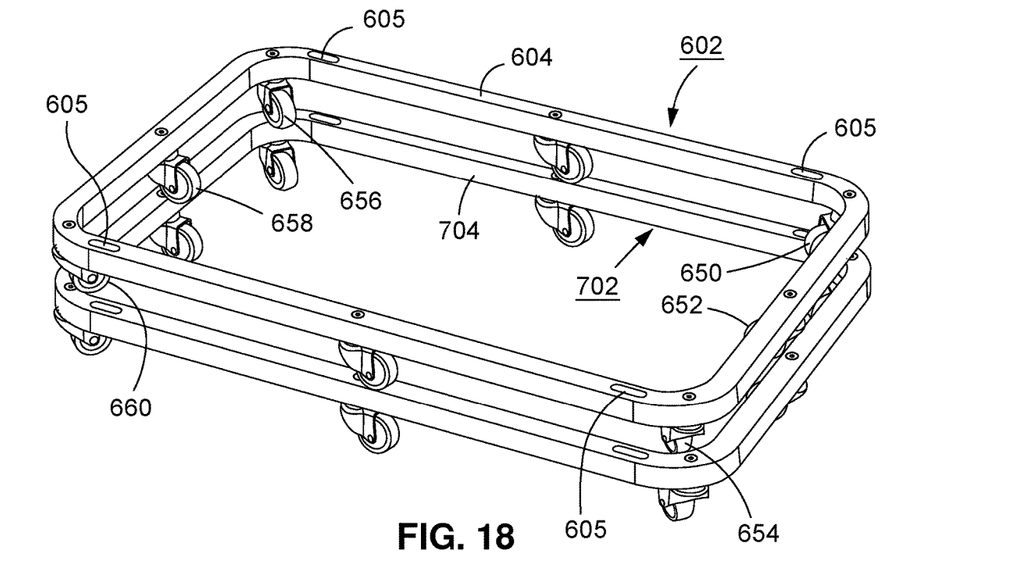
FIG. 18 is an isometric view of two dolly frames in a nested position, in accordance with another non-limiting embodiment of the disclosed concept.

Most preferably, the dolly frames of the invention are stackable, such as to reduce the space occupied thereby when not in use. FIG. 18 shows two dolly frames 602,702 stacked or nested together. As shown, the dolly frames 602,702 each include bodies 604,704 having a central opening. Furthermore, each of the dolly frames 602,702 has a plurality of casters (only casters 650,652,654,656,658,660 of dolly frame 602 are labeled) coupled to a first side of the body 604,704 and configured to allow the body 604,704 to roll on a surface. It will be appreciated that the casters 650,652,654,656,658,660 (and the casters of the dolly frame 702, shown but not labeled) are sized and positioned to allow for multiple dolly frames to be stacked, such that the plurality of casters 650,652,654,656,658,660 nest within an adjacent body of an adjacent dolly frame. Furthermore, an offset of the caster (i.e., the distance from the pivot point to the axle of the wheel) is predetermined or selected to allow for the nesting of the dolly frames 602,702.

In one embodiment, a dolly frame of the invention may include means for connecting or locking items thereto. As indicated above relative to FIG. 1, such might comprise one or more locking bushings 40,42 having tabs or similar elements which can be pushed through an opening in a tote lid to secure the tote lid thereto.

As another example, continuing to refer to FIG. 18, the body 604 of the dolly frame 602 may have a plurality of openings 605 formed therethrough (such as from top to bottom). One or more straps, ropes or similar connecting element may be passed through these openings 605 and then around an object to be secured to the dolly frame. In one preferred embodiment, the one or more openings 605 are each structured and located to correspond with one of a plurality of openings of a tote lid. See, for example, openings 705 in FIG. 19 of tote lid 700.

As indicated above, in one embodiment, a dolly frame of the invention may be particularly suited to connection of a tote lid thereto. In particular, referring to FIG. 19, the body of the dolly frame 602 is configured to emulate the rim of a tote container body and allow the tote lid 700 to snap onto the dolly frame 602. In particular, the lid 700, in certain examples, includes tabs that engage the bottom surface of the body of the dolly frame 602. In the example embodiment, the plurality of openings 605 of body 604 include four openings 605 each located proximate a corresponding corner of body 604. Accordingly, in this manner, the openings 605,705 are structured to receive a fastening element therethrough. See for example, fastening element 707, shown in FIG. 19. In this embodiment, a user may purchase a dolly frame in a configuration in which it has a central opening. The user may then use a lid of an existing tote to form a deck for the dolly frame. The user may then place objects on tote lid that is supported by the dolly frame, for transport. The object(s) to be moved might be, for example, the tote that corresponds to the lid that is used to form the deck. As one example, a user might wish to move several totes which are being used to store items in their garage. The user may remove the lid from one of the totes and place it on the dolly frame, and then stack the other totes on that lid and then roll the dolly frame with associated totes, to another location. Of course, a tote lid might be used as the deck for the dolly frame which is then used to support other items (other than totes) for transport.

Figure 20:
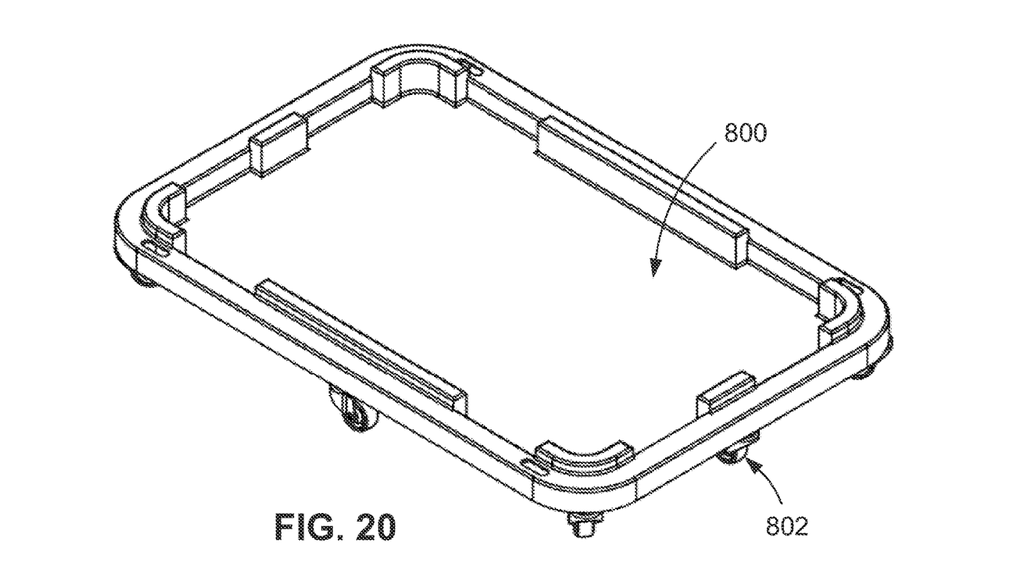
FIG. 20 is an isometric view of another dolly frame coupled to a tote lid, in accordance with another non-limiting embodiment of the disclosed concept.
Figure 21:
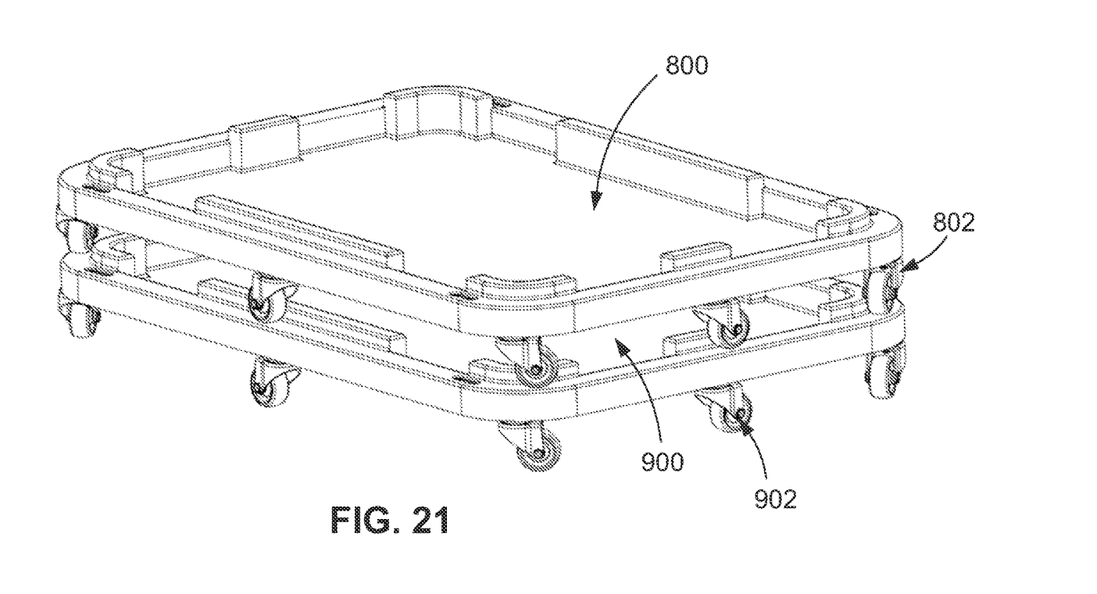
FIG. 21 is an isometric view of the dolly frame and tote lid of FIG. 20, shown as employed with another dolly frame and tote lid, in accordance with another non-limiting embodiment of the disclosed concept.

FIG. 20 shows an isometric view of another tote lid 800 coupled to a dolly frame 802, in accordance with another non-limiting embodiment of the disclosed concept. It will be appreciated that dolly frame 802 is configured to have eight casters (e.g., compare with dolly frame 602 in FIG. 19). Furthermore, as shown in FIG. 21, dolly frame 802 and tote lid 800 are advantageously configured to be stacked with other dolly frames/tote lids (e.g., dolly frame 902/tote lid 900).

Figure 22:
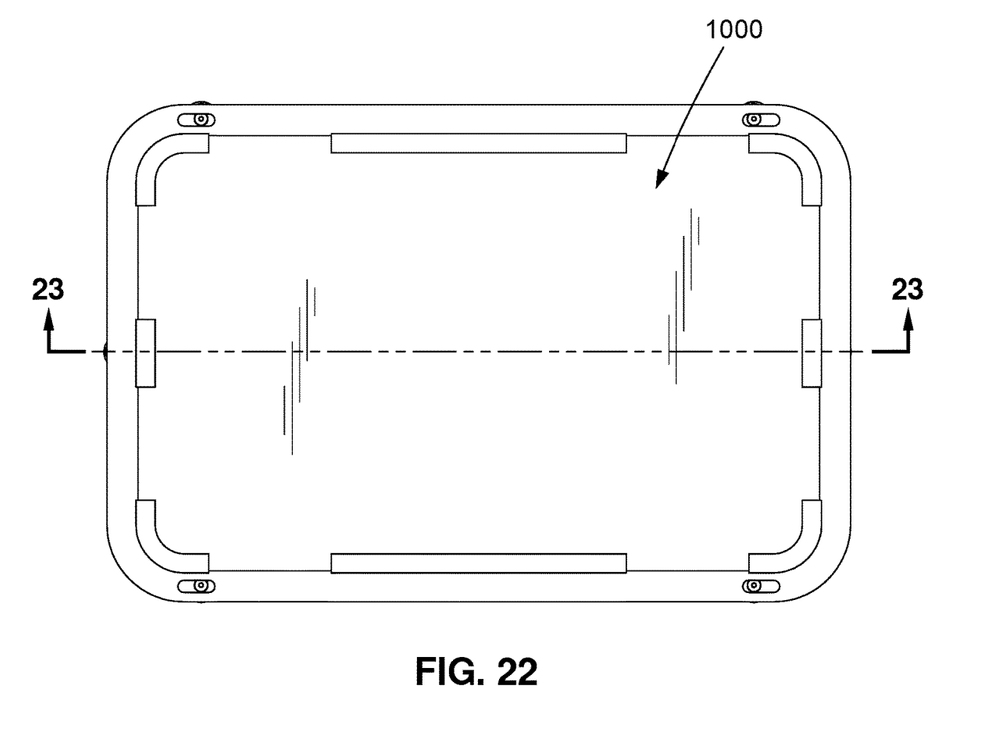
FIGS. 22 and 23 are top plan and section views, respectively, of another tote lid and dolly frame, in accordance with another non-limiting embodiment of the disclosed concept.
Figure 23:
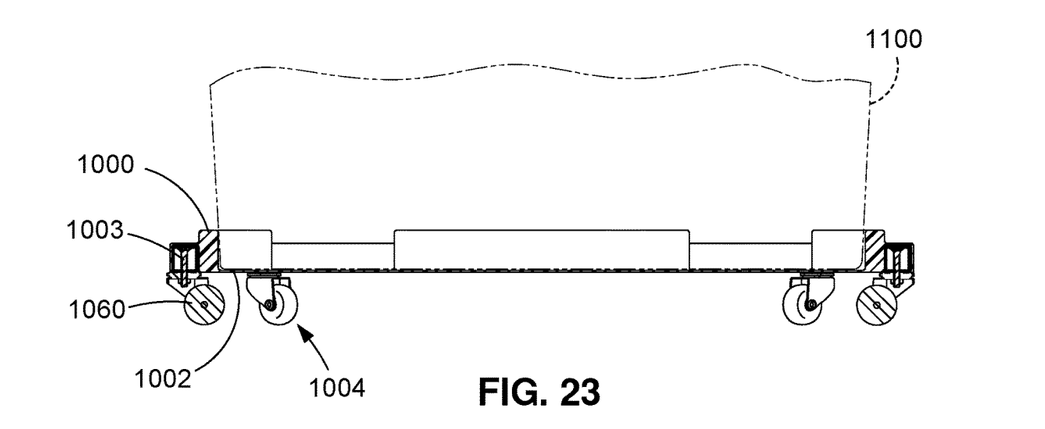

FIGS. 22 and 23 show different views of another tote lid 1000 and dolly frame 1002, with FIG. 23 being shown with a tote 1100 disposed on tote lid 1000. It will be appreciated that any suitable number of totes may be stacked. Additionally, as shown in FIG. 23, a caster 1060 of dolly frame 1002 is coupled to a first side of body via a fastener (e.g., without limitation, flat head bolt 1003). It will be appreciated that all casters provided herein may be similarly coupled to bodies via suitable fasteners.

The dolly frame configuration, including caster configuration, of the invention has numerous advantages. Traditional wood dolly frames with only four casters have a limited number of support/connection points, making them more likely to fail. By employing more casters, the potential for failure is therefore is much lower. Further, wood dolly frames cannot accommodate attachment points, as holes therethrough would compromise their structural integrity. Continuing to refer to FIG. 23, the caster 1060 (e.g., and all other casters disclosed herein) may be countersunk to allow the bolt 1003 to sit flush with the rest of body 1004. This countersunk hole also strengthens the body 1004.

Furthermore, it will also be appreciated that casters may be welded to bodies of dolly frames, in accordance with embodiments of the disclosed concept. Additionally, by making the dolly frame 1002 out of materials other than wood, the dolly frame 1002 (and other dolly frames in accordance with the disclosed concept) can be NSF certified, and therefore be used in kitchens, the medical field, and clean rooms (e.g., contamination issues are associated with wood dolly frames). Wood dolly frames also breakdown, warp, swell, and shrink because of the environment that they are in. Dolly frames in accordance with the disclosed concept, which are not made of wood, do not suffer from this drawback.

This description uses examples to describe embodiments of the disclosure and also to enable any person skilled in the art to practice the embodiments, including making and using any devices or systems and performing any incorporated methods. The patentable scope of the disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A dolly frame comprising:
a rectangular-shaped body movable between a retracted position and an expanded position, the body comprising:
a first apparatus having a pair of ends, and a second apparatus coupled to the first apparatus, the second apparatus having a pair of ends each defining an opening extending into the second apparatus, and each configured to accept therein a corresponding one of the pair of ends of the first apparatus;
a top; and
a bottom which is spaced below the top; and
a plurality of casters extending from the bottom away from the top such that the body is elevated above the casters for acceptance into a tote body accepting recessed groove in a bottom of a tote lid, the casters being configured to allow the body to roll on a surface,
wherein, when the body moves from the retracted position to the expanded position, the first apparatus slides with respect to the second apparatus, thereby increasing a perimeter of the body.

2. The dolly frame according to claim 1, wherein the first and second apparatus are each U-shaped.

3. The dolly frame according to claim 2, wherein the first U-shaped apparatus extends into the second U-shaped apparatus.

4. The dolly frame according to claim 2, wherein the pair of ends of the first apparatus are defined by a first component and a second component each slidably coupled to the first apparatus and which are configured to be slidably accepted into respective openings of the pair of ends of the second apparatus.

5. The dolly frame according to claim 4, wherein the first and second U-shaped apparatus each comprise a first segment and a second segment coupled to the first segment, and wherein, when the body moves from the retracted position to the expanded position, the first segment slides with respect to the second segment, thereby increasing the perimeter of the body.

6. The dolly frame according to claim 4, wherein the body further comprises at least one bushing coupled to one of the pair of ends of at least one of the first and second U-shaped apparatus in order to allow the at least one of the first and second U-shaped apparatus to grip one of the first and second components.

7. The dolly frame according to claim 6, wherein the body further comprises a spring clip coupled to an end of the one of the first and second components, wherein the spring clip is configured to engage an inner edge of the at least one bushing when the one of the first and second components is pulled apart from the at least one of the first and second U-shaped apparatus.

8. The dolly frame according to claim 6, wherein the at least one bushing comprises four bushings each one for a corresponding one of the pair of ends of each of the first and second U-shaped apparatus.

9. The dolly frame according to claim 4, wherein the body further comprises a first bushing and a second bushing each coupled to a middle region of a corresponding one of the first and second components in order to allow the body to latch onto said tote lid.

10. The dolly frame according to claim 2, wherein the body further comprises at least one strap coupled to the first U-shaped apparatus and the second U-shaped apparatus, and extending across an opening created by the first and second U-shaped apparatus.

11. A dolly frame comprising:
a rectangular-shaped body comprising a first apparatus and a second apparatus coupled to the first apparatus, the body being movable between a retracted position and an expanded position; and
a plurality of casters coupled to a first side of the body and configured to allow the body to roll on a surface,
wherein, when the body moves from the retracted position to the expanded position, the first apparatus slides with respect to the second apparatus, thereby increasing a perimeter of the body, wherein the first apparatus is a first end panel and the second apparatus is a main body panel, wherein the body further comprises a second end panel disposed opposite the first end panel, and wherein, when the body moves from the retracted position to the expanded position, the second end panel slides with respect to the main body panel, thereby increasing a perimeter of the body.

12. The dolly frame according to claim 11, wherein the body further comprises a first component and a second component each slidably coupled to the main body panel, the first end panel, and the second end panel.

13. The dolly frame according to claim 12, wherein the body comprises a first U-shaped apparatus and a second U-shaped apparatus each coupled to a corresponding one of the first and second end panels, wherein the plurality of casters comprises a first caster coupled to the first U-shaped apparatus, a second caster coupled to the second U-shaped apparatus, a third caster coupled to the first component, and a fourth caster coupled to the second component.

14. The dolly frame according to claim 12, wherein the first end panel, the second end panel, and the main body panel each have a first sleeve portion and a second sleeve portion each structured to receive a corresponding one of the first component and the second component.

15. The dolly frame according to claim 14, wherein the first sleeve portion and the second sleeve portion of the main body panel receive the corresponding first and second sleeve portions of the first and second end panels when the body is in the retracted and expanded positions.

16. The dolly frame according to claim 12, wherein each of the first and second end panels comprises a peripheral portion and a stop member extending inwardly from the peripheral portion, and wherein the stop member of the first and second end panels is configured to maintain a tote in a predetermined position with respect to the body.

17. A dolly frame adapted to accept a tote lid, the dolly frame comprising:
a rectangular-shaped body having a central thru hole; and
a plurality of casters coupled to a first side of the body and configured to allow the body to roll on a surface, the plurality of casters being sized and positioned to allow for multiple dolly frames to be stacked, such that the plurality of casters nest within an adjacent body of an adjacent dolly frame,
wherein the frame is configured to receive the tote lid in a snap-fit manner such that the first side is engaged with the tote lid.

18. The dolly frame according to claim 17, wherein the body has a plurality of openings formed therein each structured to correspond with one of a plurality openings of the tote lid, wherein the openings of the body and the openings of the tote lid are structured to receive a fastening element therethrough.

19. The dolly frame according to claim 18, wherein the plurality of openings of the body includes four openings each disposed proximate a corresponding corner of the rectangular-shaped body.

20. The dolly frame according to claim 17, wherein the body is not made of wood.

* * * * *